Aug. 8, 1933.   C. E. MAYNARD   1,921,533
FLUID PRESSURE CONNECTION
Filed Dec. 19, 1930   2 Sheets-Sheet 2

INVENTOR.
Charles Edgar Maynard
BY
Chapin & Neal
ATTORNEY.

Patented Aug. 8, 1933

1,921,533

UNITED STATES PATENT OFFICE 1,921,533

FLUID PRESSURE CONNECTION

Charles Edgar Maynard, Northampton, Mass., assignor to The Fisk Rubber Company, Chicopee Falls, Mass., a Corporation of Massachusetts Application December 19, 1930. Serial No. 503,590

5 Claims. (Cl. 285—163)

My invention relates to fluid pressure connections and more particularly to fluid pressure connections used in vulcanization of pneumatic tire casings and the like. While the connection of my present invention is particularly adapted for use in vulcanizers for molding and curing pneumatic tire casings such, for example, as the vulcanizer shown in my co-pending application Serial Number 399,754, filed October 15, 1929, it will be understood that my invention is applicable to vulcanizers for molding and curing other articles, and to vulcanizers of other types than that shown.

The object of my invention is to provide a fluid pressure connection which will be simple in construction, rapid and substantially automatic in operation and economical to build and maintain. Other and further objects of my invention will be apparent from the following specification and claims.

Referring to the drawings.

Figure 1:
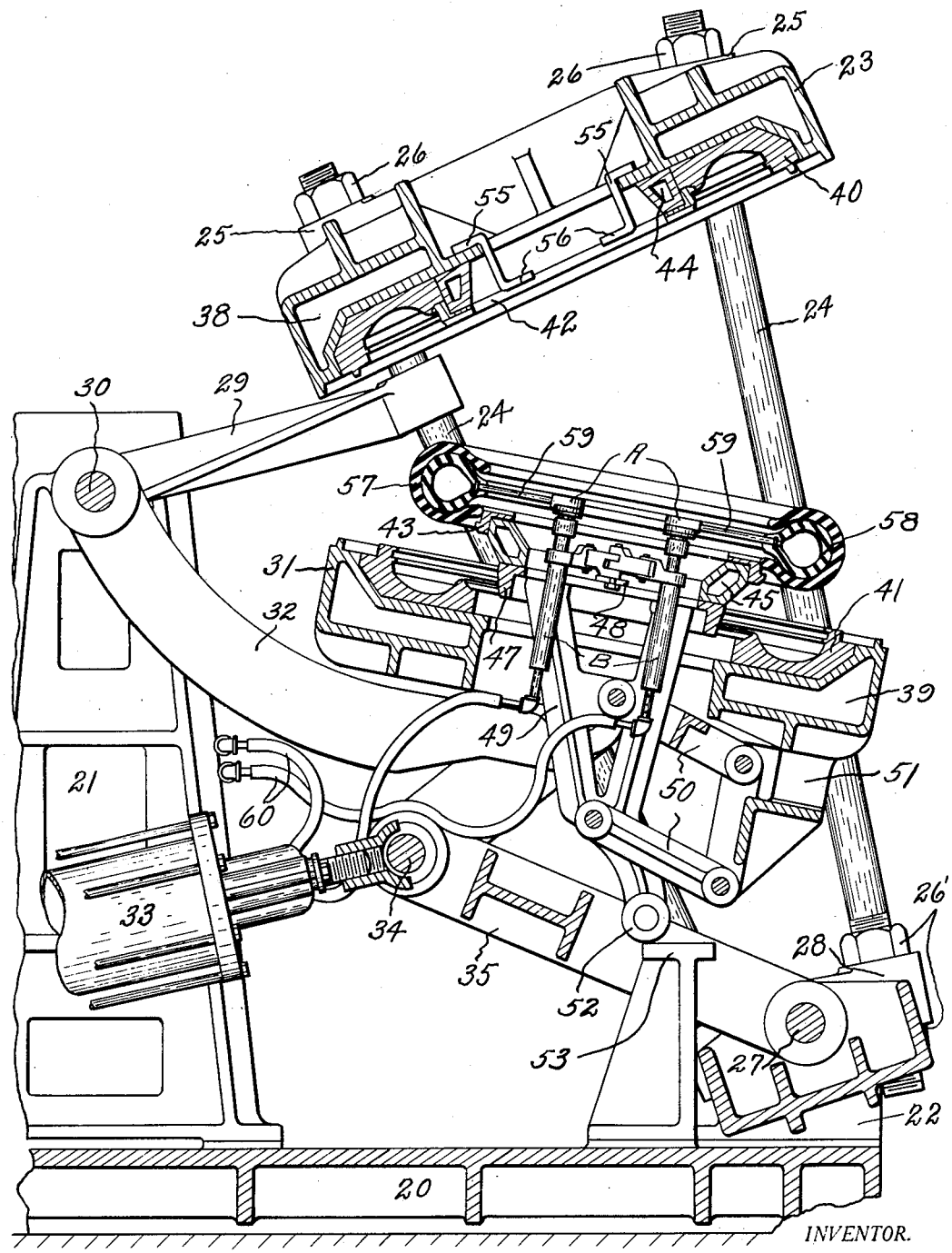
Fig. 1 is a view, partly in section, showing the connections in the position they assume when the mold is open.
Figure 2:
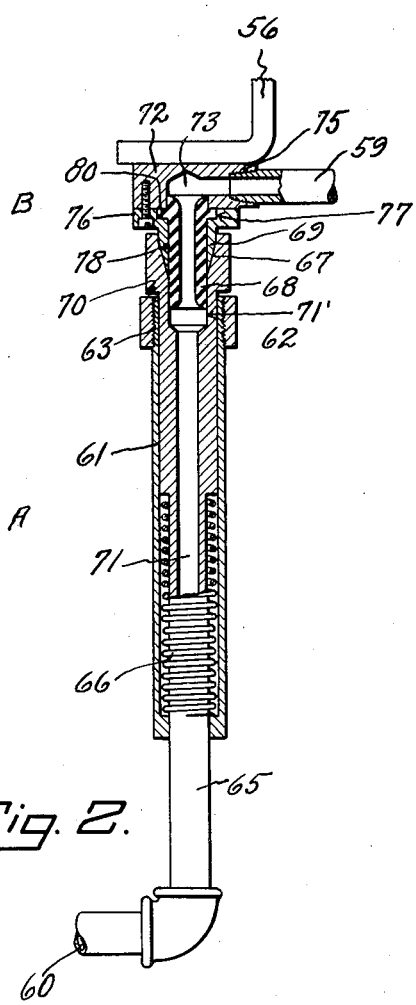
Fig. 2 is a detail view of one of the connections shown in Fig. 1, with certain parts shown in section and showing the connection in the position occupied when the mold is closed.

Referring particularly to Fig. 1 of the drawings, I provide a self-draining base plate 20 upon which is bolted a frame 21, and a cross member 22. The vulcanizing mold unit comprises an upper half which is held stationary and a movable lower half. The upper stationary mold half is secured in a steam chamber 23 which is supported by four rods 24 passing through bosses 25 formed on the outer periphery of the steam chamber, nuts 26 adjustably securing the chamber 23 to the rods 24. The rods on each side of the mold converge toward each other and are adjustably secured by nuts 26' in bosses 28 formed on the outer ends of the adjacent cross member 22.

The chamber 23 is held in an inclined position and the inner pair of rods 24 are connected by bracket arms 29 to shaft 30 carried by frame 21. The lower movable mold half is secured in a lower movable steam chamber 31, secured to arms 32 pivoted on shaft 30. The lower mold and its associated parts are moved about pivot 30 to and from closed relation with the stationary mold half by means of a hydraulic cylinder 33, the piston rod of which is connected to a pivot 34 of toggle levers 35 pivoted to the under side of chamber 31 and shaft 27 carried by the adjacent cross-piece 22. The hydraulic cylinder 33 is pivoted at its closed end to a shaft, not shown, secured in side frames 21 and a central support, not shown, bolted to the base 20.

When the mold is closed the toggle pivot 34 is moved slightly beyond its dead center to lock the mold in its closed position and no separate locking means is necessary. As described in my co-pending application Serial Number 399,754, the internal pressure in the tire being vulcanized cannot be applied until the toggle is at or beyond dead center so the hydraulic pressure in the cylinder 33 is never called on to oppose the pressure in the tire, thus the hydraulic pressure in cylinder 33 need not exceed that necessary to raise the lower mold member.

Referring to Fig. 1, the mold members 23 and 31 are chambered as at 38 and 39, respectively, for the circulation of steam or other heating fluid and are formed to receive respective mold halves 40 and 41. I have made bead rings 42 and 43 as separate members provided with separate respective chambers 44 and 45 formed integral with or secured to the rings, each ring being associated with its respective mold half. Removably secured to the upper mold member 23 are members 55 provided with arms 56 adapted, when the mold is closed, to establish and maintain a sealing relation between the fluid pressure connection members as will be later described.

The bead ring 43 with its steam chamber 45 is removably secured to a supporting ring 47, carrying a fluid pressure linkage supporting member 48, and provided with a downwardly extending bracket frame 49 pivoted by parallel links 50 to a bracket 51 carried by the lower mold member 31. Frame 49 is provided with a roll 52 adapted, when the lower mold member is in lowered position, as shown in Fig. 1 to engage a stop 53, bolted to the base 20, just before the lower mold member reaches its completely open position, thus arresting the further downward movement of the bead ring to strip the tire from the lower mold half. The elevated position of the lower bead ring when the vulcanizer is open facilitates the placing of the raw tires in the mold, assures its accurate positioning and since it is held out of contact with the lower half of the mold proper there is no danger of the over curing of the lower sidewall of the tire if the closing of the mold is for any reason delayed.

Vulcanizers operating as above described present certain difficulties in the connection of the fluid pressure bag in the casing with the pressure supply pipes. As will be evident from an inspection of Fig. 1, when the mold closes relative movement between the tire casing and the lower mold half takes place as the casing is lowered into place by the dropping of the lower bead ring, and the valve stem of the pressure bag moves still nearer the lower bead ring as the tire beads are pressed together by the bead rings upon complete closure of the mold.

Heretofore it has been necessary to connect the pressure line to the valve stem of the bag by hand either before or after the mold is closed. Such connections, in order to secure a tight seal, have required substantial hand manipulation, and have represented a substantial time factor in the vulcanizing operation. If the connection is made after the mold is closed the heating of the mold must furthermore be controlled to prevent vulcanization starting before the fluid pressure is applied.

By my invention I retain all of the advantages of the refinements of mold operation above described and provide a connection which only requires the operator to assemble the parts together, the seal being effected by the closure of the mold members.

The specific arrangement for supporting and operating the fluid pressure connection members provides a very simple yet sturdy assembly. In the embodiment shown fluid pressure and heat are applied to the interior of the casing 57 during vulcanizing operation by means of an annular tube or bag 58 through which hot water under pressure is circulated. The bag 58 is provided with two valve stems 59, diametrically opposite each other, which are connected to the pressure supply and exhaust lines 60 by means of the pressure connections. As the two pressure connection units are similar a description of one will serve as a description of both.

Each unit consists of a lower portion A carried by and movable with the lower bead ring supporting members and an upper portion B carried by the valve stem of the pressure bag 58. The portion A comprises a hollow open-ended cylindrical housing 61 adjustably secured in the free end of an arm 62 as by threads 63. Arm 62 is pivotally secured to a link 64 which in turn is pivotally mounted on the cross member 48 of the supporting ring 47.

Slidably mounted in the housing 61 is a plunger 65 extending through an opening at the bottom of the housing. The plunger is constantly urged upward by spring 66 and has a conical seat or socket 67 for centralizing the flexible member 68 and plug 69 of portion B of the fluid pressure connection as later more fully described. A shoulder 70 limits the downward movement of the plunger 65. A bore 71 extends the entire length of the plunger and communicates with the pressure supply, or discharge, line 60. The upper end of bore 71 is enlarged as at 71'.

The upper member B consists of a block-like member 72 with an aperture 73 having a female-threaded portion 75 into which is screwed the vulcanizing bag valve stem 59. Screw-bolted to the block-like member 72 is a tight fitting member 76 provided with an annular chamber 77 and a smaller cylindrical shaped bore 78. The free end of member 76 is tapered as at 69 forming a conical plug adapted to mate with socket 67 of portion A. Fitted in bore 78 is a hollow cylindrical packing member 68, preferably of soft rubber, formed with a flange 80 clamped in the annular chamber 77. A portion of the packing member 68 extends beyond the conical plug 69. The packing member is adapted to be received in the enlarged opening 71' of the plunger 65 and form a fluid seal against the inner wall of the apertured plunger, the aperture of which communicates with the fluid supply or discharge tubes 60.

Figure 3:
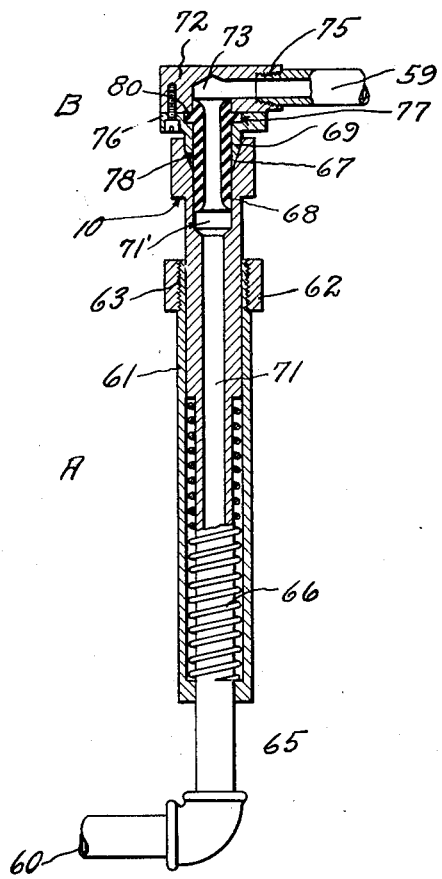
Fig. 3 is a view similar to Fig. 2, showing the parts assembled but prior to the closing of the mold.
Figure 4:
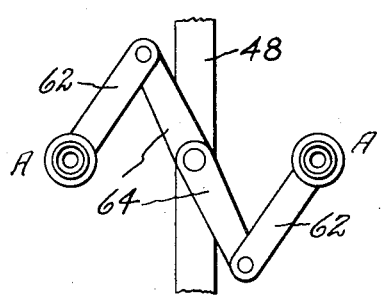
Fig. 4 is a plan view of that portion of the fluid pressure connections carried by the mold and linkage for the same.

In the operation of the apparatus the casing and curing bag assembly is placed on the bead ring portion 43 with the lower portion A of the connection positioned so the upper portion B, when assembled with the valve stem 59, can be inserted in the lower portion substantially as shown in Figs. 1 and 3. The free end of packing 68 is inserted in the opening formed in the plunger 65 with the plug 69 entering the socket 67 provided therefor in the plunger. The metal to metal contact of plug 69 and socket 67 serves to secure a proper seating of the packing member 68 and relieves the latter of undue strain and wear from distortion. The mold is now ready to be closed. As the mold closes the top of the block-like member 72 will contact with the arm 56, thereby insuring proper seating of the packing 68 and plug 67 in the plunger 65 as the beads are forcibly seated on the bead rings 42 and 43, thus causing the valve stems 59 to move in relation to the bead rings. The arm 56 is positioned so it causes a downward movement of the plunger to compress the spring 66, resulting in a substantially upward, yieldable pressure which assures the proper seating of the upper and lower portions A and B of the connections, thus obtaining a tight seal. The internal pressure supplied to the bag 58 during vulcanization presses the packing 68 outwardly into fluid tight engagement with the walls of the plunger 65 and plug 69. When the mold is opened the tire is automatically stripped from the mold as described, leaving it on the bead ring. To remove the tire assembly from the bead ring it is only necessary to lift the tire to pull the upper portion B of the connection free from the lower connection A.

My invention provides for quickly connecting and disconnecting the air bag valve with a fluid supply and fluid conduit, the actual sealing of the connection being automatically accomplished by the closure of the mold and the application of fluid pressure.

The details of construction may be modified without departing from the scope of my invention, and my improved connection may be used in the vulcanization of other articles than tire casings or in other types of tire vulcanizers.

Having thus described my invention, I claim:

1. A fluid pressure connection for vulcanizers having a pair of separable mold sections which comprises a connection member adapted to be supported by one of the mold members, a second connection member, including an expansible tubular packing member, adapted to be carried by the article to be vulcanized and adapted to be assembled in telescoped relation with the first connection prior to the closing of the mold, the free end of the expansible packing member being positioned to engage the inner walls of the first connection member and expand into sealing contact therewith in the presence of fluid pressure in the connection.

2. A fluid pressure connection for vulcanizers having a pair of separable mold sections which comprises a connection member adapted to be yieldingly supported by one of the mold members, a second connection member, including an expansible tubular packing member, adapted to be carried by the article to be vulcanized and adapted to be assembled in telescoped relation with the first connection member prior to the closing of the mold and means adapted to be carried by the other mold member to press the connection members together upon closure of the mold members.

3. A fluid pressure connection for vulcanizers having a pair of separable mold sections which comprises a connection member adapted to be supported by one of the mold members, a second connection member, including an expansible tubular packing member, adapted to be carried by the article to be vulcanized and adapted to be assembled in telescoped relation with the first connection prior to the closing of the mold, the free end of the expansible packing member being positioned to engage the inner walls of the first connection member and expand into sealing contact therewith in the presence of fluid pressure in the connection, and means adapted to be carried by the other mold member to press the connection members together upon closure of the mold members.

4. A fluid pressure connection for vulcanizers which comprises a bored member having rigid walls and provided at one end with a flared seat, a second bored member provided with a conical plug adapted to seat in the flared end of said first member and a flexible tubular packing member, secured in and extending beyond the end of the conical plug adapted to engage the walls of the bore of said first member and make sealing contact therewith in the presence of fluid pressure in the connection.

5. A fluid pressure connection for vulcanizers which comprises a cylindrical housing, a spring pressed bored plunger carried in the housing, a flared seat formed in one end of the plunger, a member having a bored conical plug adapted to seat in the flared end of the plunger and a flexible tubular packing member secured in and extending beyond the end of the conical plug adapted to engage the inner walls of the plunger and make sealing contact therewith in the presence of fluid pressure in the connection.

CHARLES EDGAR MAYNARD.